(12) United States Patent
Chen

(10) Patent No.: US 6,979,082 B2
(45) Date of Patent: Dec. 27, 2005

(54) EYEGLASS ASSEMBLY AND COUPLING SYSTEM

(75) Inventor: Chih-Lung Chen, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 2 days.

(21) Appl. No.: 10/755,266

(22) Filed: Jan. 13, 2004

(65) Prior Publication Data

US 2005/0151925 A1   Jul. 14, 2005

(51) Int. Cl.⁷ ............................................. G02C 1/08
(52) U.S. Cl. ........................... 351/90; 351/99; 351/153
(58) Field of Search .............................. 351/41, 83–86, 351/99–102, 111, 119, 121, 153; 16/228

(56) References Cited

U.S. PATENT DOCUMENTS 5,227,817 A * 7/1993 Simioni ...................... 351/80

2003/0179342 A1 * 9/2003 Madison ...................... 351/99

* cited by examiner

Primary Examiner—Huy Mai
(74) Attorney, Agent, or Firm—Rosenberg, Klein & Lee

(57) ABSTRACT

An eyeglass assembly and coupling system is assembled by an upper half frame, a lower half frame, a pair of lenses and a pair of temples. The characteristic lies in that the upper half frame is provided with an upper hollow in the bridge portion, a flanged portion is formed at each side of the upper hollow, an elongated groove is provided at one side of each flanged portion, and each flat end of the upper half frame is provided with a screw hole. The lower half frame is provided with a flanged block at the bridge portion, a lower hollow is formed at each side of the flanged block, an elongated groove is provided at one side of each lower hollow, and each flat end of the lower half frame is provided with a screw hole.

2 Claims, 7 Drawing Sheets

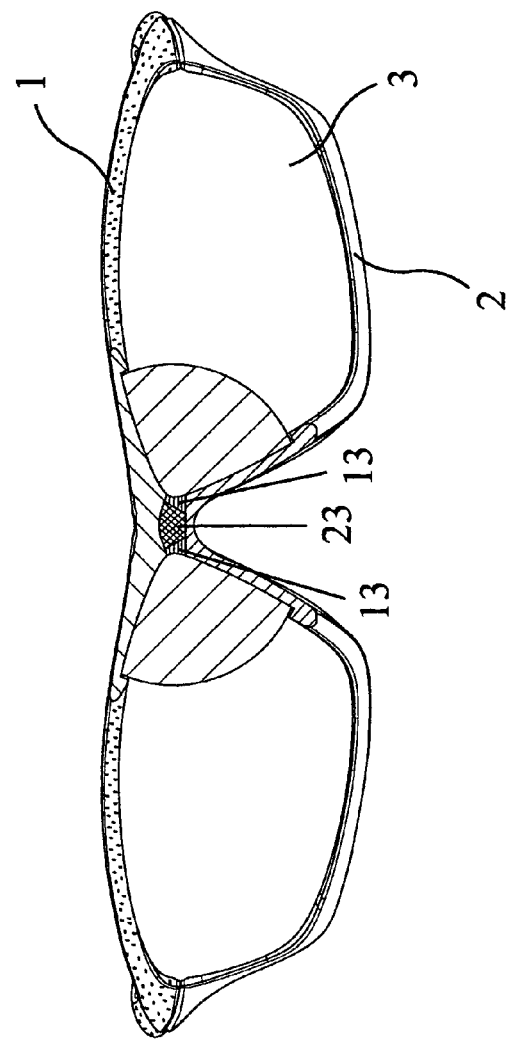
FIG. 7
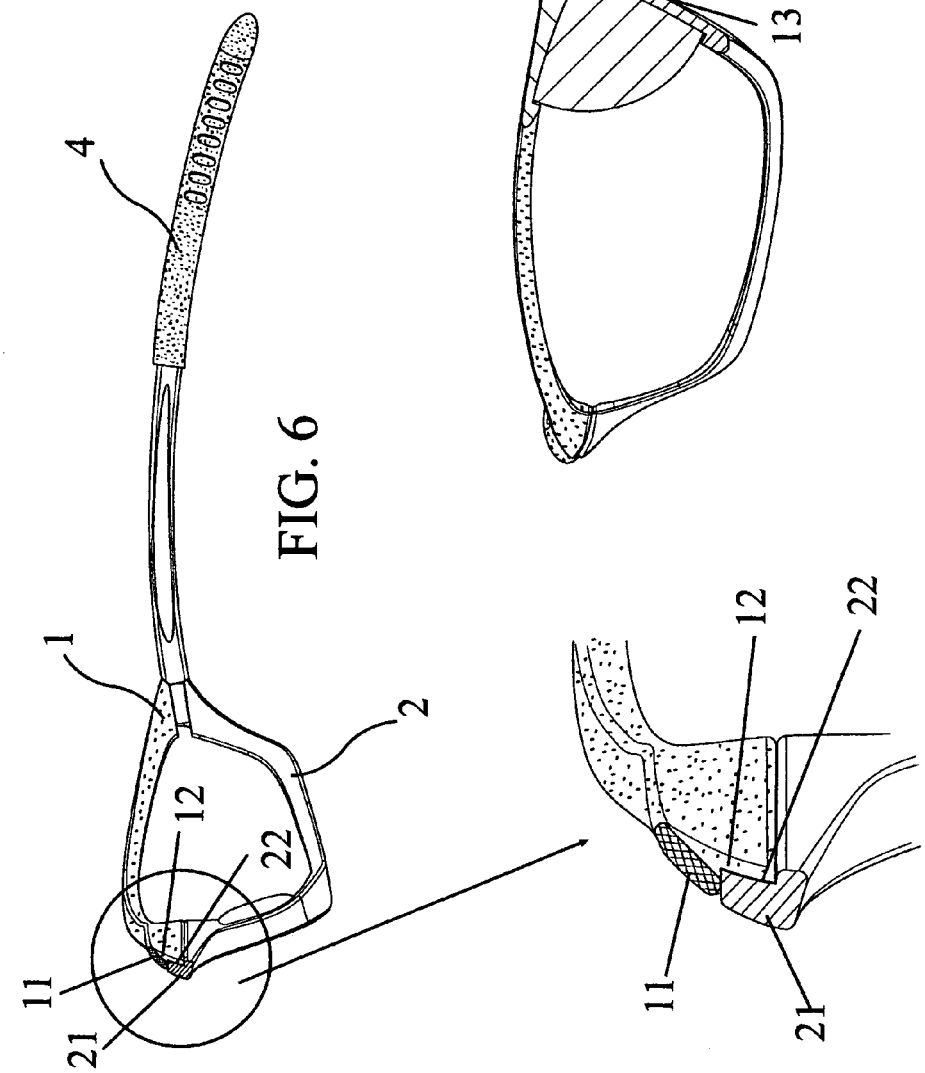
FIG. 6
FIG. 6-1

US 6,979,082 B2

EYEGLASS ASSEMBLY AND COUPLING SYSTEM

BACKGROUND OF THE INVENTION

1. Field of the Invention

The present invention relates to an eyeglass assembly with innovatory convenience and security features, and more particularly, the present invention is directed to a coupling system which includes an upper half frame and a lower half frame be easily and promptly assembled or disassembled.

2. Description of the Related Art

Eyeglasses are indispensable for modern people in daily life. Generally, a conventional frame 101 of an eyeglasses 10 is made of metal or plastic material and is made into one piece. Referring to FIG. 1, in order for a pair of lenses 102 to be respectively inlaid in the hollows 103 of the frame 101, the size of each lens 102 must accord with that of each hollow 103 because the size of each hollow 103 is fixed. When being assembled, each lens 102 is forced to be inlaid in the groove 104 of each hollow 103.

Although the above-mentioned assembling manner can obtain the purpose of finishing assembling an eyeglasses 10, it causes much trouble and inconvenience to assemble the lenses 102 with the frame 101 by forcing each lens 102 to be inlaid in the groove 104 of each hollow 103. Moreover, it would cause damage to the lenses 102. Besides, the frame 101 is made to be one single color after formation, and it must be additionally painted in order to become colorific. It not only causes inconvenience but also costs more.

Therefore, another conventional eyeglass assembly 20 was invented to overcome the drawbacks. Referring to FIGS. 2, 3 and 4, the conventional eyeglass assembly 20 is provided with screws holes 2011 and 2021 respectively at both ends of an upper half frame 201 and a lower half frame 202, and a screw N is penetrated through the screw holes 2011 and 2021, so as to thereby assemble the upper half frame 201 with the lower half frame 202.

Although the above-mentioned another conventional eyeglass assembly 20 can effectively overcome the trouble in securing lenses 203, screws N are needed to assemble the upper half frame 201 with the lower half frame 202, and it still causes much trouble and inconvenience to a manufacture. Furthermore, it may not be asthetically pleasing to some customers.

SUMMARY OF THE INVENTION

Therefore, the present invention is designed to provide an eyeglass assembly and coupling system that can substantially obviate the drawbacks of the related conventional arts.

An object of the present invention is to provide an eyeglass assembly and coupling system which includes an upper half frame and a lower half frame to be easily and promptly assembled and disassembled.

Another object of the present invention is to provide an eyeglass assembly and coupling system which is convenient for replacing different colors of an upper half frame or a lower half frame for aesthetic appearance of the eyeglass assembly.

Yet another object of the present invention is to provide an eyeglass assembly which can reduce labor costs.

Accordingly, an eyeglass assembly and coupling system in the present invention is assembled by an upper half frame, a lower half frame, a pair of lenses and a pair of temples. The characteristic lies in that the upper half frame is provided with an upper hollow in the bridge portion, a flanged portion is formed at each side of the upper hollow, an elongated groove is provided at one side of each flanged portion, and each flat end of the upper half frame is provided with a screw hole. The lower half frame is provided with a flanged block at the bridge portion, a lower hollow is formed at each side of the flanged block, an elongated groove is provided at one side of each lower hollow, and each flat end of the lower half frame is provided with a screw hole.

BRIEF DESCRIPTION OF THE DRAWINGS

Other features and advantages of the present invention will become apparent in the following detailed description of the preferred embodiments with reference to the accompanying drawings, in which:

FIG. 6 is a side cross-sectional view of an embodiment of the eyeglass assembly in assembled configuration in accordance with the present invention;

FIG. 6-1 is a partially enlarged view taken from the circle in FIG. 6;

FIG. 7 is a front cross-sectional view of an embodiment of the eyeglass assembly in assembled configuration in accordance with the present invention;

DETAILED DESCRIPTION OF THE PREFERRED EMBODIMENTS

Figure 5:
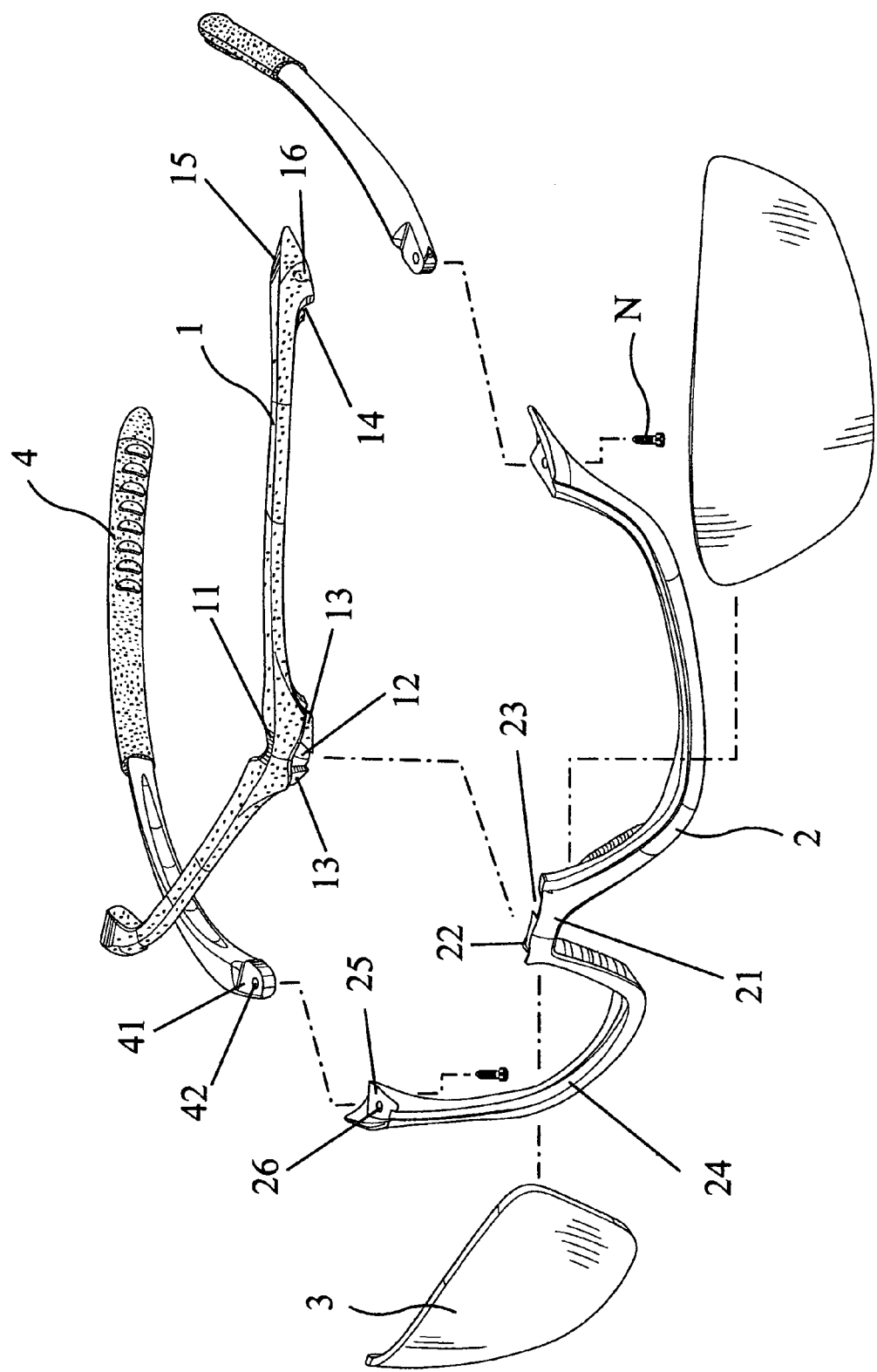
FIG. 5 is a perspective exploded view of an embodiment of an eyeglass assembly and coupling system in accordance with the present invention.

Referring to FIG. 5, an embodiment of an eyeglass assembly and coupling system in the present invention is assembled by an upper half frame 1, a lower half frame 2, a pair of lenses 3 and a pair of temples 4.

The upper half frame 1 is provided with an upper hollow 12 in the bridge portion 11, a flanged portion 13 is formed at each side of the upper hollow 12, an elongated groove 14 is provided at one side of each flanged portion 13, and each flat end 15 of the upper half frame 1 is provided with a screw hole 16.

The lower half frame 2 is provided with a flanged block 22 at the bridge portion 21, a lower hollow 23 is formed at each side of the flanged block 22, an elongated groove 24 is provided at one side of each lower hollow 23, and each flat end 25 of the lower half frame 2 is provided with a screw hole 26.

The pair of lenses 3 may be colorful or transparent, and their shpaes respectively accord with those of the elongated grooves 14 and 24 of the upper half frame 1 and the lower half frame 2.

Each temple 4 is provided with a flat end portion 41, and a screw hole 42 is provided in the flat end portion 41.

Figure 8:
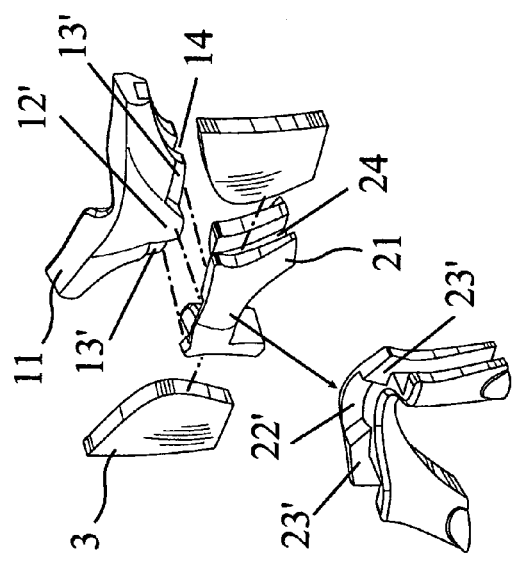
FIG. 8 is a perspective exploded view of an embodiment of another eyeglass assembly and coupling system in accordance with the present invention.

Referring to FIG. 8, another embodiment of an eyeglass assembly and coupling system in the present invention is assembled by an upper half frame 1, a lower half frame 2, a pair of lenses 3 and a pair of temples 4.

The upper half frame 1 is provided with a flanged portion 12' at the bridge portion 11, an upper hollow 13' is formed at each side of the flanged portion 12', an elongated groove 14 is provided at one side of each upper hollow 13', and each flat end 15 of the upper half frame 1 is provided with a screw hole 16.

The lower half frame 2 is provided with a lower hollow 22' in the bridge portion 21, a flanged block 23' is formed at each side of the lower hollow 22', an elongated groove 24 is provided at one side of each flanged block 23', and each flat end 25 of the lower half frame 2 is provided with a screw hole 26.

The pair of lenses 3 may be colorful or transparent, and their shpaes respectively accord with those of the elongated grooves 14 and 24 of the upper half frame 1 and the lower half frame 2.

Each temple 4 is provided with an flat end portion 41, and a screw hole 42 is provided in the flat end portion 41.

Figure 1:
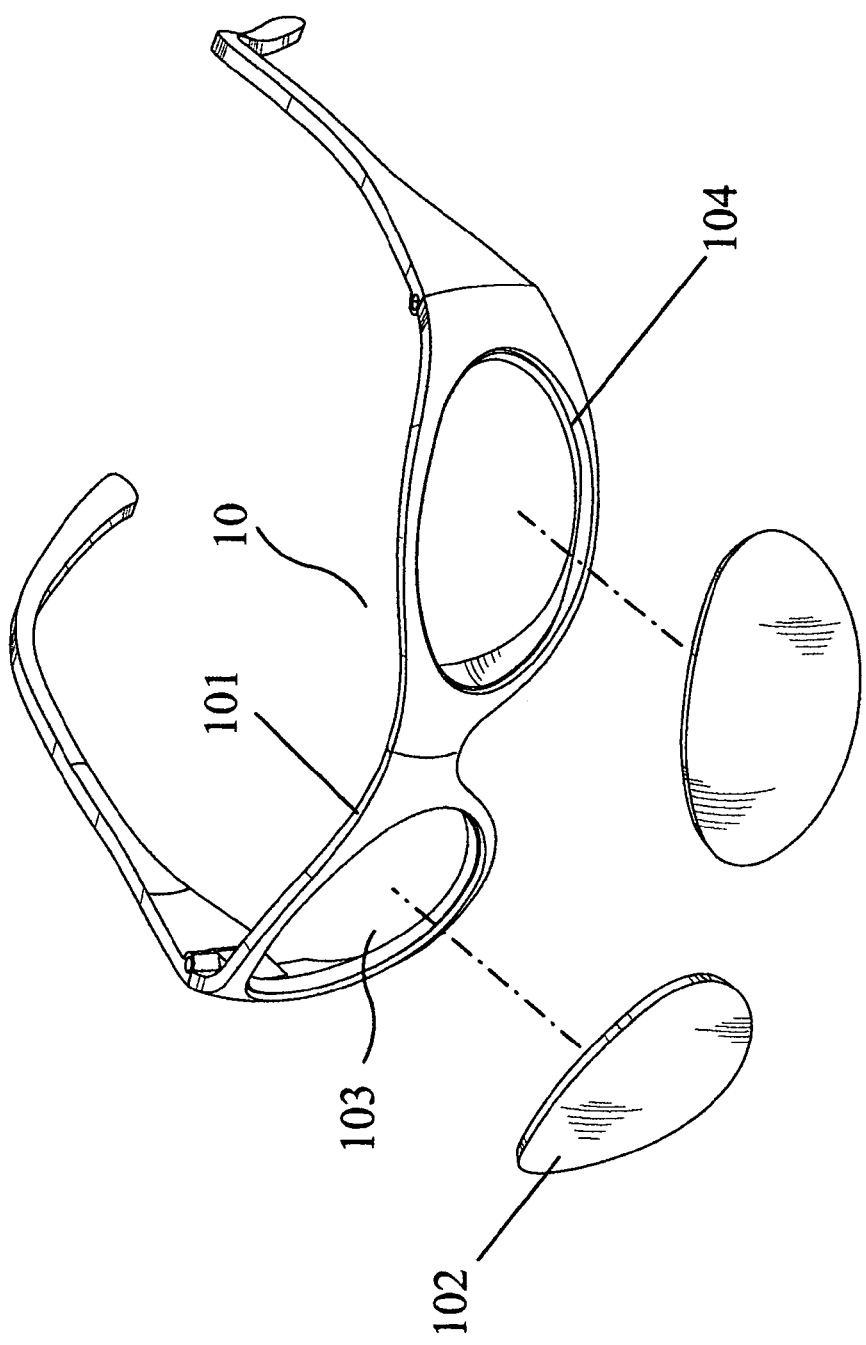
FIG. 1 is a perspective exploded view of a conventional one-piece eyeglasses.
Figure 2:
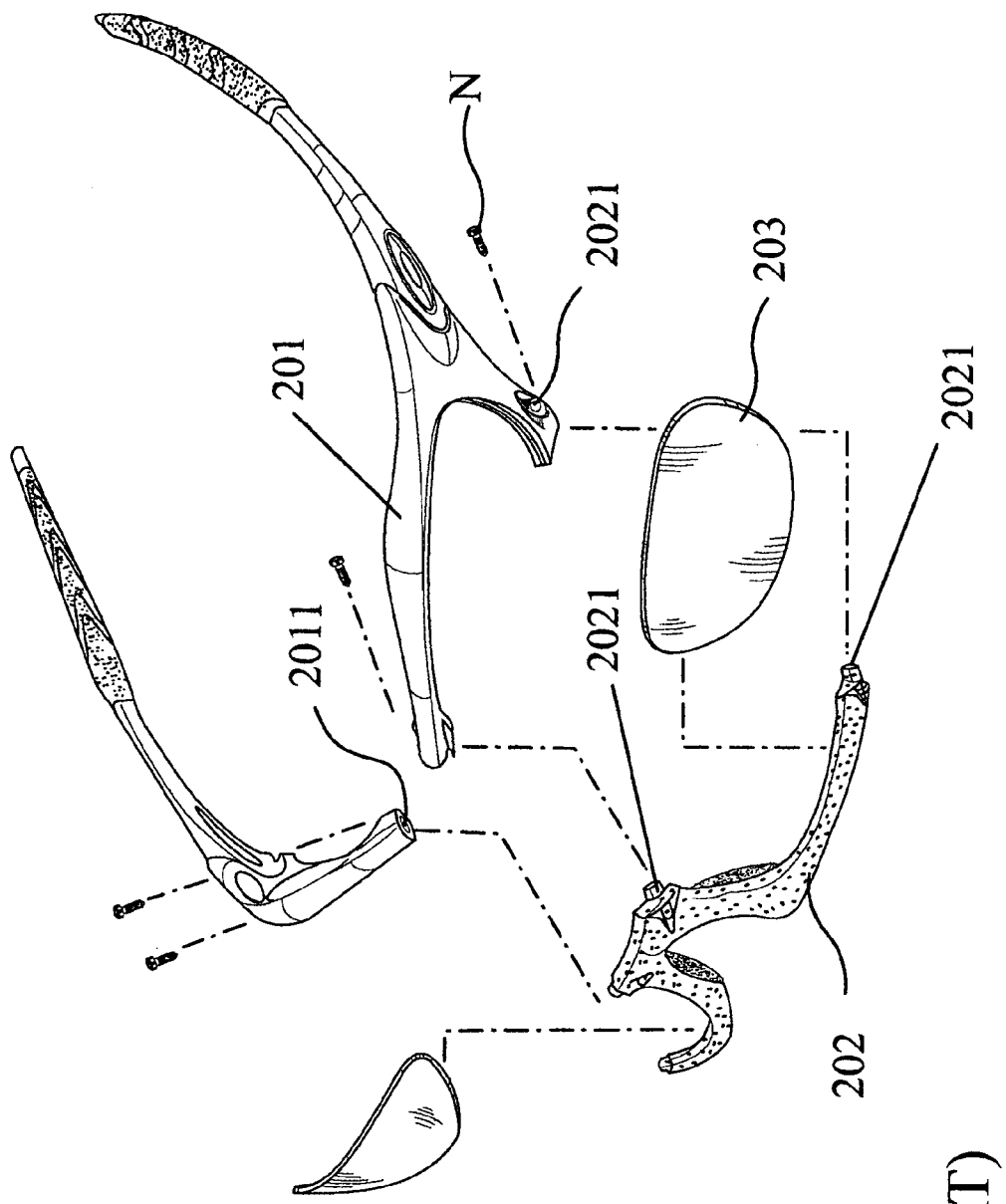
FIG. 2 is a perspective exploded view of another conventional eyeglass assembly.
Figure 3:
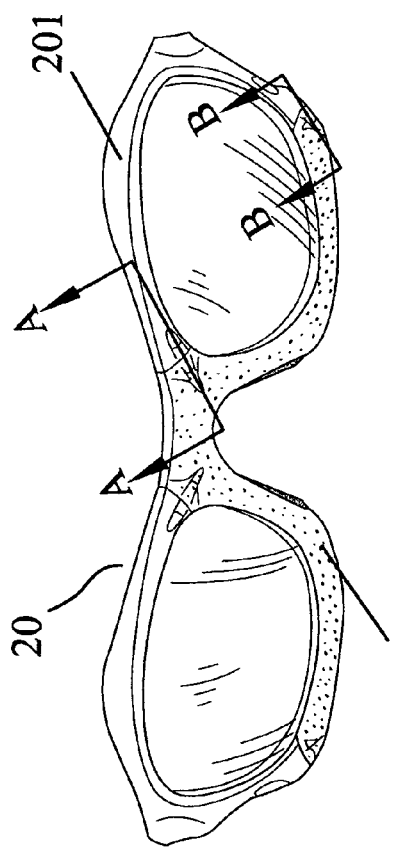
FIG. 3 is a front schematic view of another conventional eyeglass assembly in FIG. 2 in assembled configuration.
Figure 4:
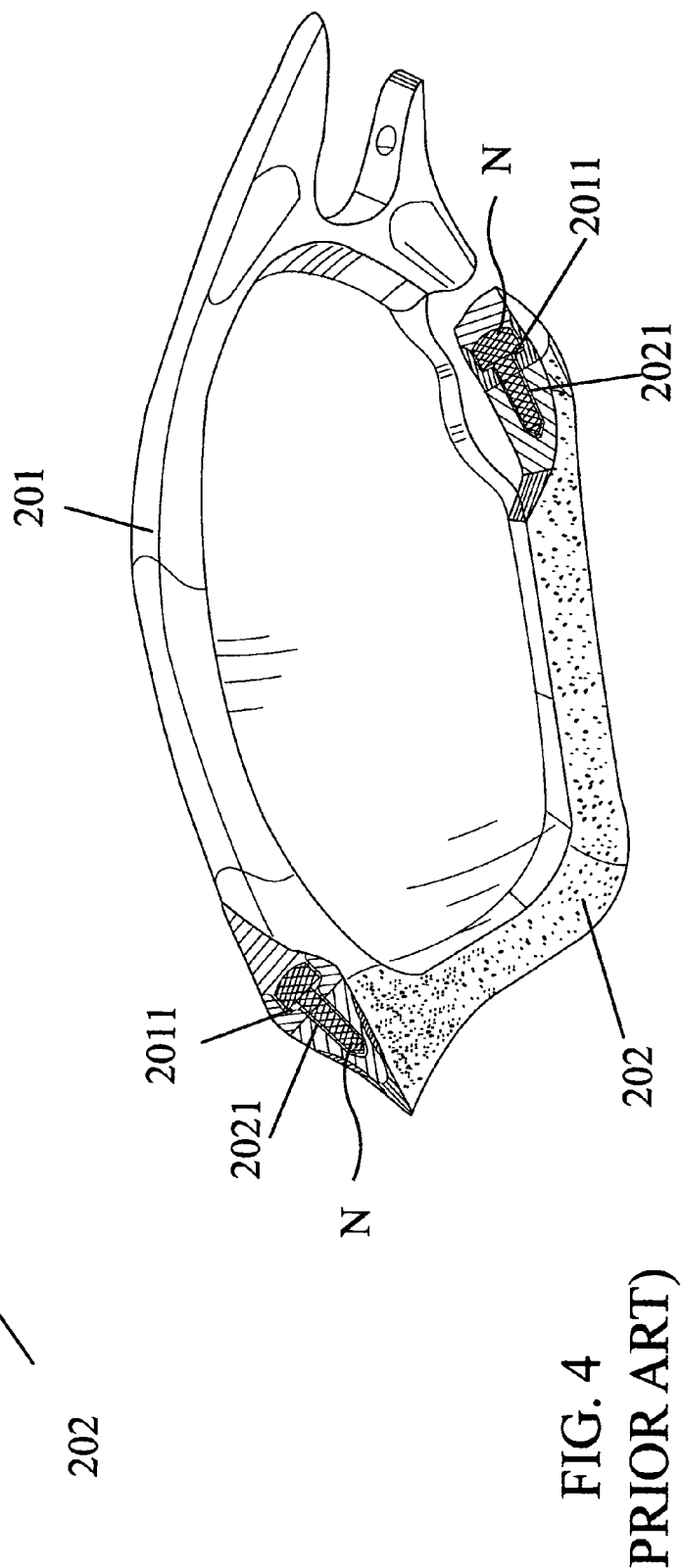
FIG. 4 is a partial cross-sectional view at lines A—A and B—B in FIG. 3.

While being assembled, referring to FIGS. 5, 6 and 6-1, the bottom circumference of a pair of lenses 3 are respectively inlaid in the elongated grooves 24 of the lower half frame 2, then the upper hollow 12 in the bridge portion 11 of the upper half frame 1 is coupled to the flanged block 22 at the bridge portion 21 of the lower half frame 2, the flanged portions 13 at both sides of the upper hollow 12 of the upper half frame 1 are respectively inserted in the lower hollow 23 at both sides of the flanged block 22 of the lower half frame 2 accordingly, and the elongated grooves 14 of the upper half frame 1 are respectively sleeved on the top circumference of the lenses 3 spontaneously so as to be firmly assembled, referring to FIG. 7. At last, the front ends 41 of temples 4 are respectively inserted in the flat ends 15, 25, so as for the screw holes 16, 42 and 26 to be registered, and screwing articles N are respectively screwed through the registered screw holes 16, 42 and 26 to firmly secure the temples 4 thereto.

Figure 9:
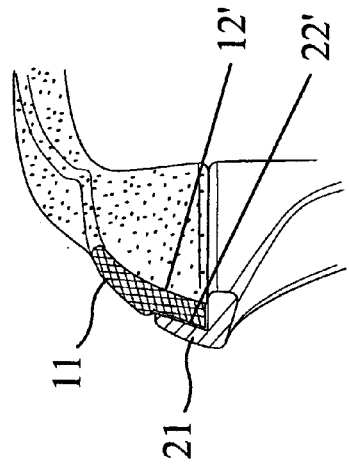
FIG. 9 is a side cross-sectional view of another embodiment of the eyeglass assembly in assembled configuration in accordance with the present invention.
Figure 10:
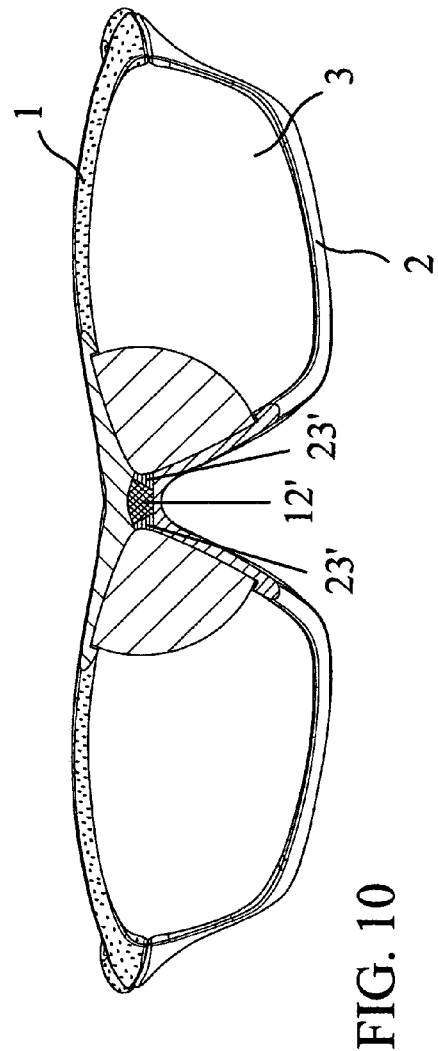
FIG. 10 is a front cross-sectional view of another embodiment of the eyeglass assembly in assembled configuration in accordance with the present invention; and, FIG. 11 is a perspective view of the eyeglass assembly in assembled configuration in accordance with the present invention.
Figure 11:
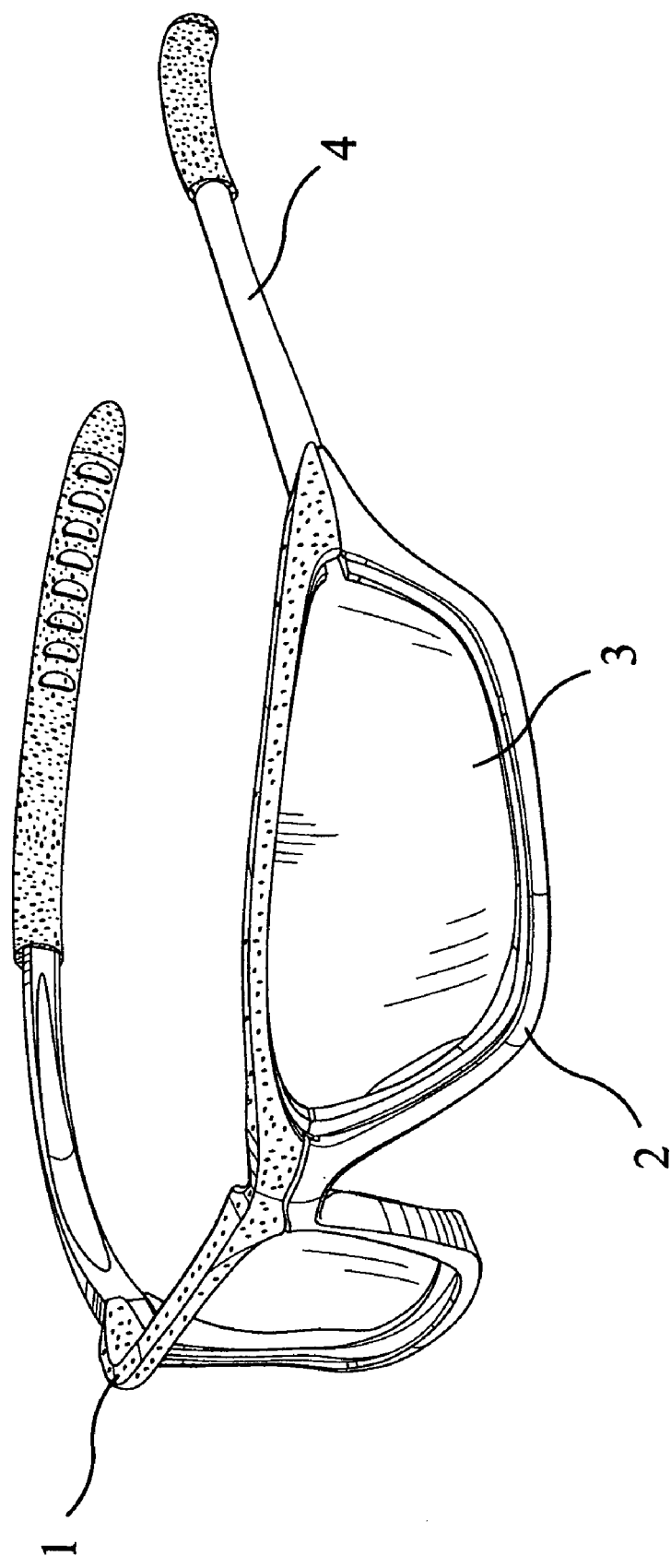

Referring to FIG. 8, while another embodiment of the eyeglass assembly being assembled, the bottom circumference of a pair of lenses 3 are respectively inlaid in the elongated grooves 24 of the lower half frame 2, then the flanged portion 12' at the bridge portion 11 of the upper half frame 1 is inserted in the lower hollow 22' in the bridge portion 21 of the lower half frame 2, the upper hollows 13' at both sides of the flanged portion 12' of the upper half frame 1 are respectively coupled to the flanged blocks 23' at both sides of the lower hollow 22' accordingly, and the elongated grooves 14 of the upper half frame 1 are respectively sleeved on the top circumference of the lenses 3 spontaneously so as to be firmly assembled, referring to FIGS. 9 and 10. At last, the front ends 41 of temples 4 are respectively inserted in the flat ends 15, 25, so as for the screw holes 16, 42 and 26 to be registered, and screwing articles N are respectively screwed through the registered screw holes 16, 42 and 26 to firmly secure the temples 4 thereto.

While the preferred embodiments of the invention have been described above, it will be recognized and understood that various modifications may be made thereto, and the appended claims are intended to cover all such modifications which may fall within the spirit and scope of the invention.

What is claimed is:

1. An eyeglass assembly and coupling system comprising:

an upper half frame being provided with an upper hollow in a bridge portion thereof and first flat ends being formed at opposing ends of said upper half frame, an upper flanged portion being formed at each side of said upper hollow, an upper elongated groove being provided at one side of each said upper flanged portion, each of said first flat ends of said upper half frame being provided with a first screw hole;

a lower half frame being provided with a lower flanged block at a bridge portion thereof and second flat ends being formed at opposing ends of said lower half frame, a lower hollow being formed at each side of said lower flanged block, a lower elongated groove being provided at one side of each said lower hollow, each of said second flat ends of said lower half frame being provided with a second screw hole;

a pair of lenses, said pair of lenses being respectively disposed in said upper and lower elongated grooves with said upper half frame and said lower half frame being aligned and said upper flanged portions being disposed in said lower hollows and said lower flanged block being disposed in said upper hollow; and, a pair of temples each having a flat end portion with a third screw hole formed therein, said flat end portions of said pair of temples being respectively disposed between corresponding first and second flat ends with said first, second and third screw holes being aligned and secured by fasteners to both secure said upper and lower half frames together and form a pivotal coupling for said pair of temples.

2. An eyeglass assembly and coupling system comprising:

an upper half frame being provided with an upper flanged portion at a bridge portion thereof and first flat ends being formed at opposing ends of said upper half frame, an upper hollow being formed at each side of said upper flanged portion, an upper elongated groove being provided at one side of each said upper hollow, each of said first flat ends of said upper half frame being provided with a first screw hole;

a lower half frame being provided with a lower hollow in a bridge portion thereof and second flat ends being formed at opposing ends of said lower half frame, a lower flanged block being formed at each side of said lower hollow, a lower elongated groove being provided at one side of each said lower flanged block, each of said second flat ends of said lower half frame being provided with a second screw hole;

a pair of lenses, said pair of lenses being respectively disposed in said upper and lower elongated grooves with said upper half frame and said lower half frame being aligned and said upper flanged portion being disposed in said lower hollow and said lower flanged blocks being disposed in said upper hollows; and, a pair of temples each having a flat end portion with a third screw hole formed therein, said flat end portions of said pair of temples being respectively disposed between corresponding first and second flat ends with said first, second and third screw holes being aligned and secured by fasteners to both secure said upper and lower half frames together and form a pivotal coupling for said pair of temples.

* * * * *